(12) United States Patent
Fermor

(10) Patent No.: US 9,739,944 B1
(45) Date of Patent: Aug. 22, 2017

(54) RECONFIGURABLE PLUGGABLE TRANSCEIVER

(75) Inventor: David Fermor, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 13/548,455

(22) Filed: Jul. 13, 2012

(51) Int. Cl.
*G02B 6/26* (2006.01)
*H04B 10/40* (2013.01)
*G02B 6/42* (2006.01)

(52) U.S. Cl.
CPC .............. *G02B 6/26* (2013.01); *G02B 6/4243* (2013.01); *H04B 10/40* (2013.01)

(58) Field of Classification Search
CPC . H04B 10/40; G02B 6/36; G02B 6/42; G02B 6/424; G02B 6/4243; G02B 6/4245; G02B 6/10; G02B 6/43; H05K 3/30
USPC ......... 250/216, 239, 227.11, 227.14, 227.17, 250/227.18, 227.19, 227.28, 227.29, 250/227.31, 227.32; 398/22, 46, 50, 110, 398/116, 117, 128–130, 135–140, 141, 398/142; 356/220; 385/77, 92, 4, 9, 12, 385/13, 28, 32, 39, 54, 55, 58, 65, 66, 69, 385/70, 73, 80, 81, 83, 84, 86, 87, 90, 91, 385/129
See application file for complete search history.

(56) References Cited

U.S. PATENT DOCUMENTS

| 3,202,905 | A | * | 8/1965 | Gomez ................ H03G 1/0047 250/206 |
| 7,226,220 | B2 | * | 6/2007 | Choy ..................... B65D 75/22 264/1.24 |
| 7,234,880 | B1 | * | 6/2007 | Charny et al. .................. 385/92 |
| 7,785,020 | B2 | * | 8/2010 | Kim et al. ....................... 385/92 |
| 8,613,559 | B2 | * | 12/2013 | Tong et al. ..................... 385/77 |
| 2003/0031430 | A1 | * | 2/2003 | Jiang .................... G02B 6/4214 385/92 |
| 2003/0045160 | A1 | * | 3/2003 | Chen ............................ 439/488 |
| 2004/0136720 | A1 | * | 7/2004 | Mahowald et al. .......... 398/135 |
| 2007/0237466 | A1 | * | 10/2007 | Togami et al. ................. 385/92 |
| 2011/0135316 | A1 | * | 6/2011 | Fankhauser et al. ......... 398/164 |
| 2012/0170890 | A1 | * | 7/2012 | Benton ................ G02B 6/4261 385/31 |
| 2013/0039654 | A1 | * | 2/2013 | Park et al. ...................... 398/41 |
| 2013/0039662 | A1 | * | 2/2013 | Brooks et al. .................. 398/91 |

* cited by examiner

*Primary Examiner* — Georgia Y Epps
*Assistant Examiner* — Don Williams
(74) *Attorney, Agent, or Firm* — Lerner, David, Littenberg, Krumholz & Mentlik, LLP

(57) ABSTRACT

A pluggable transceiver is provided that may receive an electrical signal from a host device, convert the optical signal into an optical signal, and transmit the converted optical signal to one or more external cables. In one aspect, a pluggable transceiver may include a first transceiver connector for connecting to a host device, an optical module for converting an electrical signal to an optical signal and vice versa, and a second transceiver connector for transmitting the optical signal to external cables or devices.

21 Claims, 7 Drawing Sheets

RECONFIGURABLE PLUGGABLE TRANSCEIVER

BACKGROUND

Some networking devices include electrical interconnects, such as copper wire interconnects. While such electrical interconnects are relatively inexpensive, they may be incapable of reaching the physical distances and lack the physical attributes of other interconnects, such as optical fiber interconnects. To support the different optical technology standards the industry has focused on standardizing the networking I/O. More recently, as the cost of these optical interconnects has increased a new wave of silicon photonics has been developed. The adoption of this technology in pre-existing end equipment is non-trivial and impacts functionality, cost, and scalability.

BRIEF SUMMARY

Aspects of the disclosure provide a pluggable optical transceiver. The pluggable optical transceiver may include a housing. The pluggable optical transceiver may include a first transceiver connector configured to receive an electrical signal from a host device. The pluggable optical transceiver may include an optical module, replaceably secured within the housing, connected to the first transceiver connector and configured to convert the electrical signal to an optical signal. The pluggable optical transceiver may include a second transceiver connector for receiving the optical signal from the optical module.

According to one aspect of the disclosure, the pluggable optical transceiver may also include a jumper connected to the optical module, the jumper being configured to transmit the optical signal.

According to one aspect of the disclosure, the first transceiver connector may correspond to a host connector on the host device.

According to one aspect of the disclosure, the first transceiver connector may be a IEEE 802.3-compliant QSFP connector.

According to one aspect of the disclosure, the optical module may include a lid.

According to one aspect of the disclosure, wherein the jumper may be arranged within the housing so as not to exceed a minimum bend radius.

According to one aspect of the disclosure, the second transceiver connector may be a USB connector.

Another aspect of the disclosure provides a pluggable optical transceiver. The pluggable optical transceiver may include a housing. The pluggable optical transceiver may include a second transceiver connector configured to receive an optical signal. The pluggable optical transceiver may include an optical module, replaceably secured within the housing, connected to the second transceiver and configured to convert the optical signal to an electrical signal. The pluggable optical transceiver may include a first transceiver connector configured to transmit the electrical signal to a host device.

According to one aspect of the disclosure, the pluggable optical transceiver may also include a jumper connected to the second transceiver connector, the jumper being configured to transmit the optical signal.

According to one aspect of the disclosure, the first transceiver connector may correspond to a host connector on the host device.

According to one aspect of the disclosure, the first transceiver connector may be an IEEE 802.3-compliant QSFP connector.

According to one aspect of the disclosure, the pluggable optical transceiver may also include the optical module may include a lid.

According to one aspect of the disclosure, the jumper may be arranged so as not to exceed a minimum bend radius.

According to one aspect of the disclosure, the second transceiver connector may be USB.

Another aspect of the disclosure provides a pluggable optical transceiver for connecting to a host device, and the host device may include a motherboard including a host connector configured to connect to the pluggable optical transceiver. The pluggable optical transceiver may include a housing. The pluggable optical transceiver may include a first transceiver connector configured to receive an electrical signal from the host device. The pluggable optical transceiver may include an optical module, replaceably secured within the housing, connected to the first transceiver connector and configured to convert the electrical signal to an optical signal. The pluggable optical transceiver may include a second transceiver connector configured to receive the optical signal from the optical module.

According to one aspect of the disclosure, the pluggable optical transceiver may include a jumper connected to the optical module, the jumper being configured to transmit the optical signal.

According to one aspect of the disclosure, the first transceiver connector may correspond to a host connector on the host device.

According to one aspect of the disclosure, the first transceiver connector may be an IEEE 802.3-compliant QSFP connector.

According to one aspect of the disclosure, the optical module may include a lid.

According to one aspect of the disclosure, the jumper may be arranged so as not to exceed a minimum bend radius.

According to one aspect of the disclosure, the second transceiver connector may be USB.

DETAILED DESCRIPTION

According to aspects of the disclosure, an exemplary pluggable transceiver is provided that allows devices with copper wire interconnects to take advantage of the physical attributes of optical fiber without having to modify the existing copper wire interconnects. An exemplary pluggable transceiver may connect to any type of device which includes a copper wire interconnect, such as a networking device. The exemplary pluggable transceiver may receive an electrical signal from the copper wire interconnect on the device, convert it to an optical signal at an optical module, and transmit the optical signal to optical fiber cables through a fiber cable connector. The exemplary pluggable transceiver may also be reconfigurable in that the desired throughput may be obtained by splitting the electrical signal into a plurality of lanes and using a plurality of optical modules to convert the split electrical signals in parallel.

Figure 1:
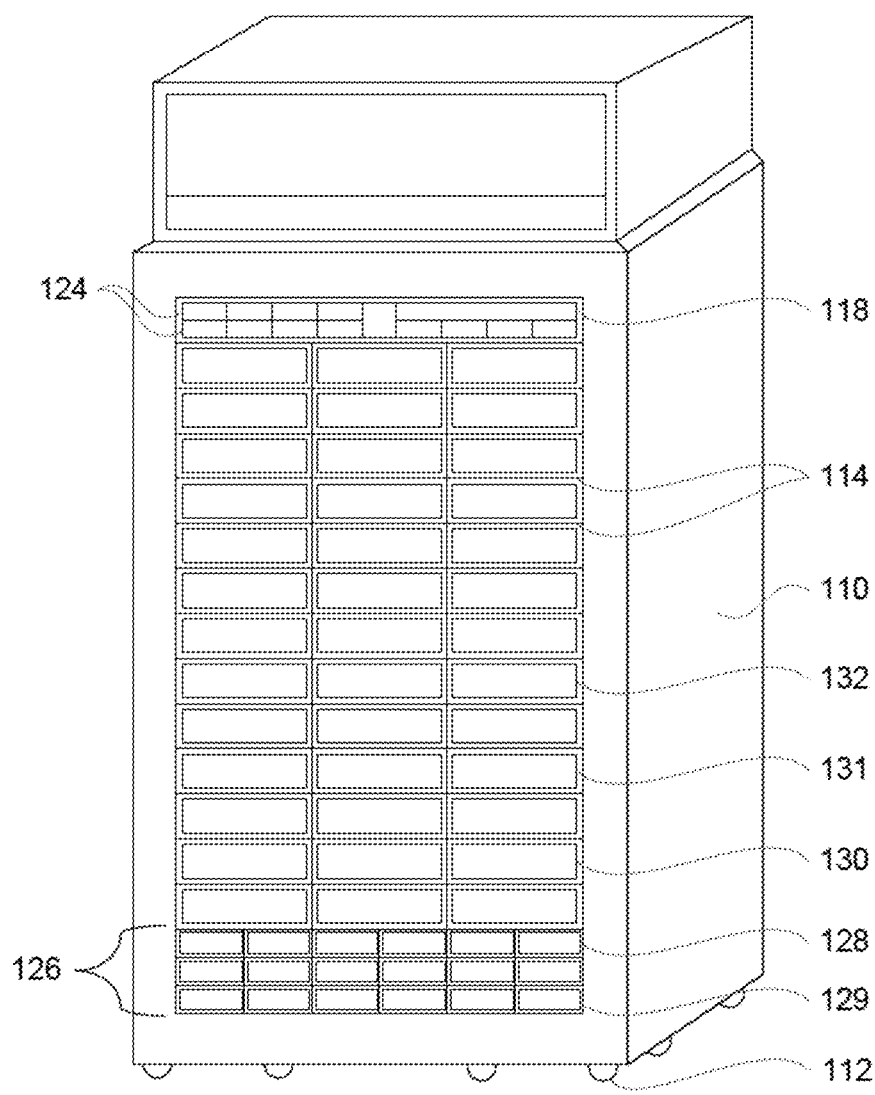
FIG. 1 is an example of a mobile rack system in accordance with aspects of the disclosure.

FIG. 1 is an example of a mobile rack system which may house a networking device to which an exemplary pluggable transceiver may be connected. FIG. 1 depicts a server system 100 that may include a mobile rack 110 having wheels 112, a plurality of shelves 114 for holding components, a rack monitoring unit (RMU) 118 for monitoring the status of the components of the rack, a plurality of rectifiers 124, a battery backup 126, battery boxes 128, 129, and a plurality of computing components 130-132. In one example, computing components 130-132 may include a device including a copper wire interconnect, and an exemplary pluggable transceiver may be connected to the device by the copper wire interconnect.

Figure 2A:
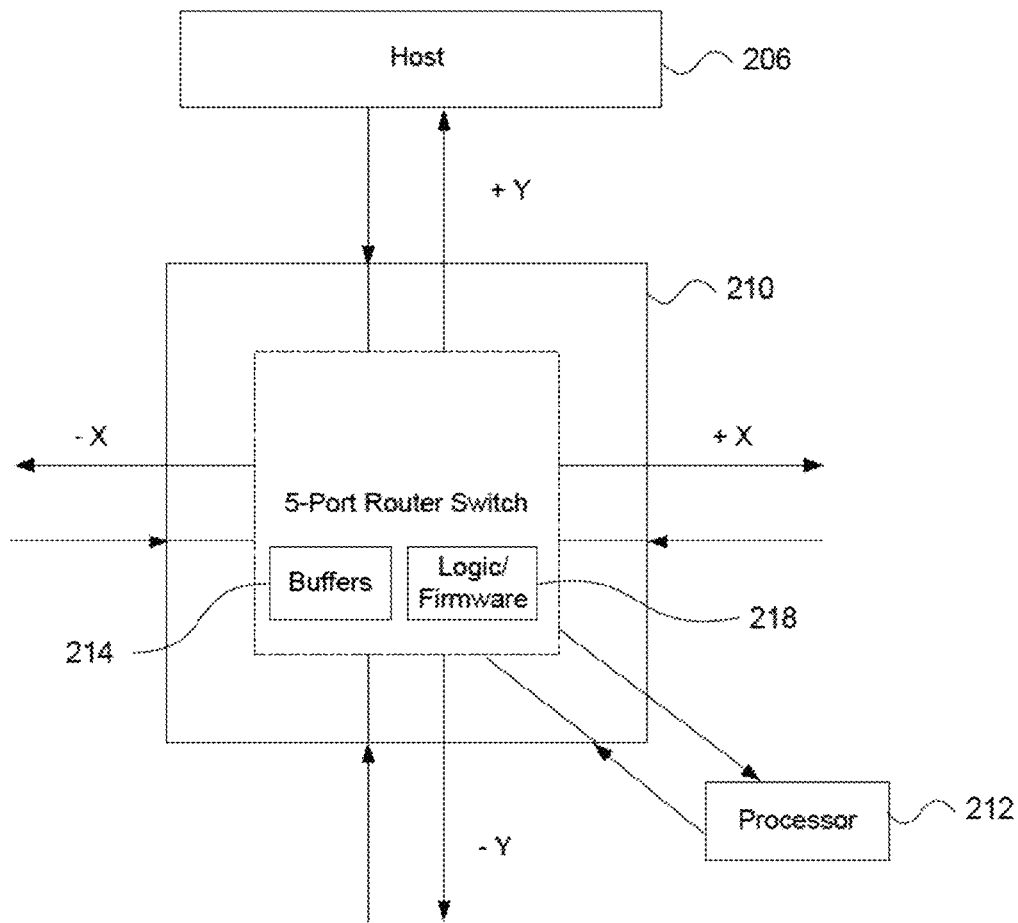
FIGS. 2A and 2B are examples of a multi-port router switch in accordance with aspects of the disclosure.

FIG. 2A is an example multi-port router switch 210 to which an exemplary pluggable transceiver may be connected. The multi-port router switch 210 may be one of the computing components included in the mobile rack system of FIG. 1. In the configuration shown, the multi-port router switch 210 is a five-port router switch. Four ports may connect to adjacent components in the +X, −X, +Y and −Y directions. The fifth port may connect to a processor 212 (e.g., a host). In one example, the four ports +X, −X, +Y, and −Y may connect to other components in the mobile rack system of FIG. 1, or may connect to other components which are not situated in the mobile rack system. In this example, the port in the +Y direction connects to a host 206. While a five-port router switch is shown, other types of multi-port switches may be employed using any number of ports. By way of example, the Mellanox InfiniScale® IV 36 port switch device may be used. This switch device may be employed in a multidimensional 6-ary, 6-flat network topology. The switches used may be of different types or configurations.

The multi-port router switch 210 may also include buffering 214 and a routing mechanism 216 for routing data packets to other components in the network. The router switch 210 may also include processing logic or firmware ("logic") 218 for determining which next component to route packets along.

Figure 2B:
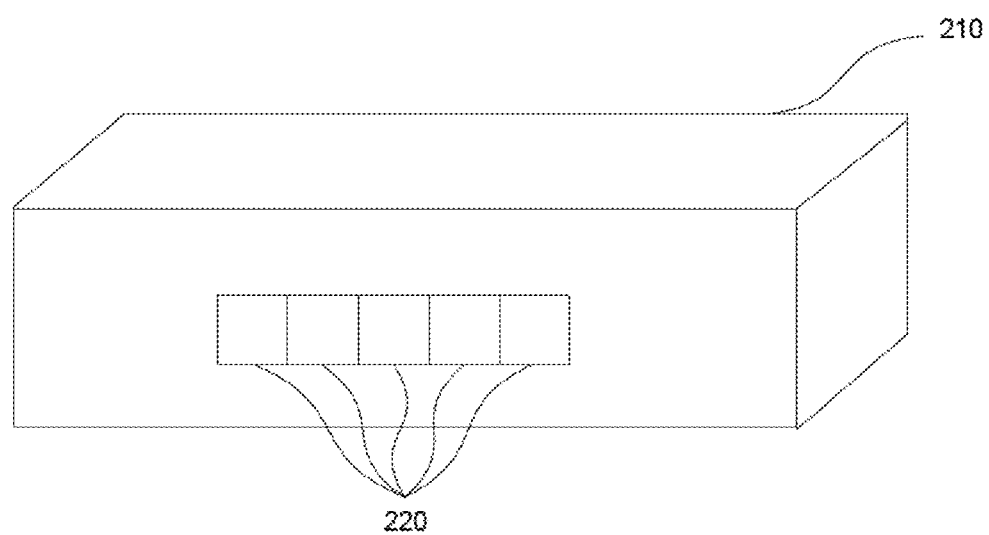

FIG. 2B is a perspective view of the example multi-port router switch 210 of FIG. 2A. In this example, the switch includes five ports 220 for connecting to components. In one aspect of the disclosure, an exemplary pluggable transceiver may connect to any of the five ports 220 on the example switch. In one example, the existing ports may be IEEE 802.3 QSFP ports.

Figure 3:
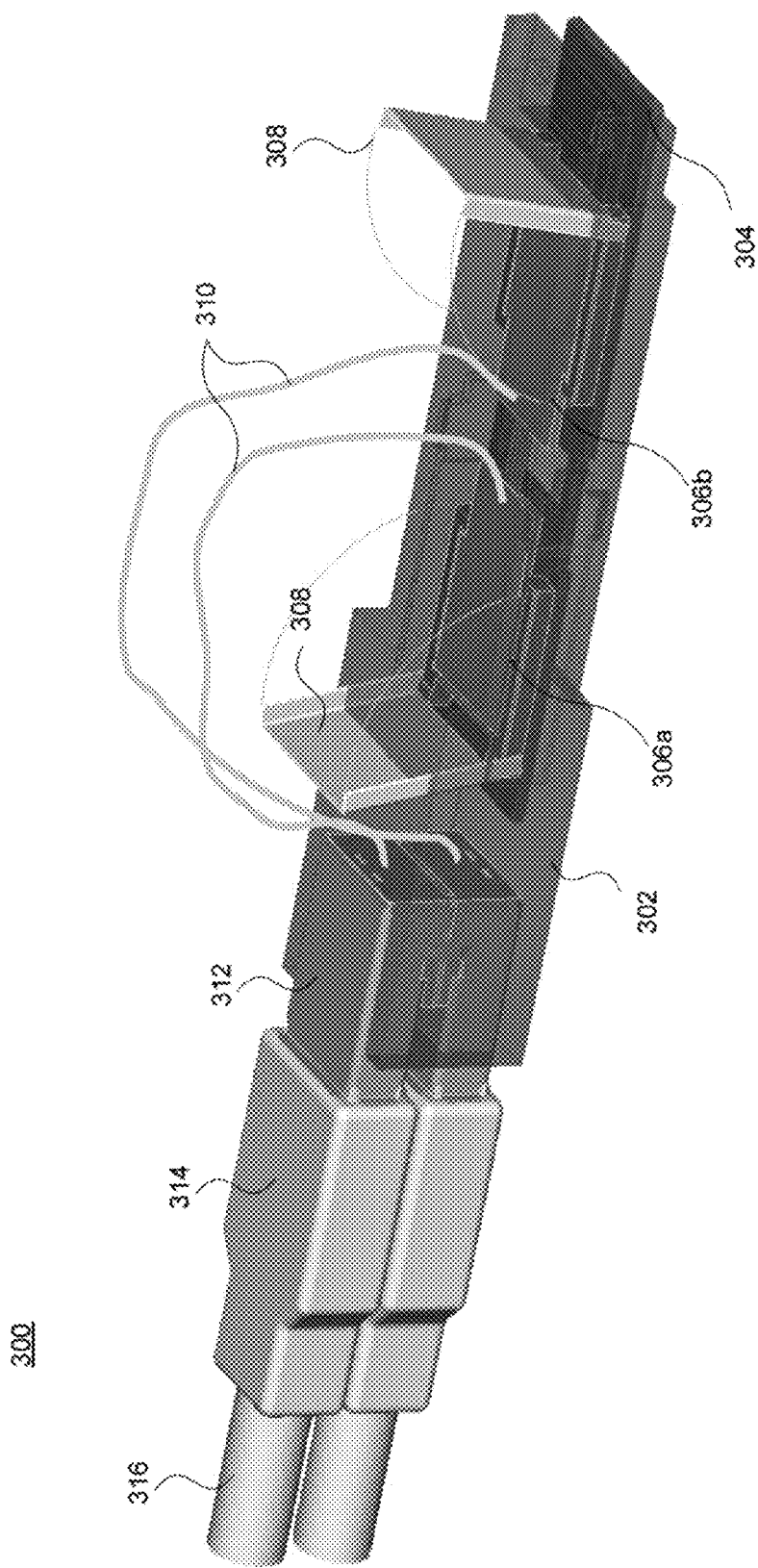
FIG. 3 is a perspective view of an exemplary pluggable transceiver according to aspects of the disclosure.

FIG. 3 is a perspective view of an exemplary pluggable transceiver 300 according to aspects of the disclosure. In one aspect of the disclosure, the exemplary pluggable transceiver 300 may interface with any type of existing port on any type of host device. In one example, the pluggable transceiver 300 may be connected to an existing port on a networking device, such as an IEEE 802.3 QSFP port on a router switch. It is contemplated that the pluggable transceiver 300 may connect to any host device with an IEEE 802.3 QSFP port, or may be modified to connect with other types of ports on other types of host devices. The pluggable transceiver 300 may also include a voltage rectifier (not shown), a microcontroller (not shown), and a memory (not shown), such as an EEPROM, to allow connection of the pluggable transceiver and for the host device to recognize the pluggable transceiver.

As shown, pluggable transceiver 300 includes a housing 302. The housing 302 may be arranged as a socket for fitting into an existing port on a host device (not shown in FIG. 3). The housing 302 may be formed of plastic, another polymer, or any material capable of housing the various components of an exemplary pluggable transceiver 300. The pluggable transceiver 300 may include a first transceiver connector 304 for connecting to the host device. The first transceiver connector 304 may be any type of connector which corresponds to an existing port on the host device. In one example, first transceiver connector 304 may be an IEEE 802.3 QSFP compliant connector, which may be connected to an existing IEEE 802.3 port on a host device. The first transceiver connector 304 may be arranged partially within the housing to allow for a portion of the first transceiver connector 304 to extend outside of the housing for connection to a host device.

Connected to the first transceiver connector 304 are one or more optical modules 306. In one example, first transceiver connector 304 may be connected to one or more optical modules 306 by a flexible cable, and they may both be formed on a printed circuit board (PCB). While FIG. 3 depicts two optical modules 306a,b, it is contemplated that pluggable transceiver 300 may include any number of optical modules 306 depending on the desired configuration, including as few as one.

The optical modules 306 may be any type of module capable of converting an electrical signal to an optical signal and vice versa. In one example, the optical modules 306 may be Lightpeak (also known as Thunderbolt®) four-lens optical modules produced by Intel®. The optical modules 306 may be arranged within the housing 302 and may include one or more lids 308. Lids 308 are depicted in FIG. 3 in an open position, but may be in a closed position during normal operation of the pluggable transceiver 300. Each one of lids 308 correspond to the optical modules 306. As mentioned above, the disclosure contemplates the use of any number of optical modules 306 and accordingly, any number of corresponding lids 308, including a single optical module and lid. The lids 308 may be removably attachable to the housing 302, or any other portion of the transceiver 300, by any attachment method, such as, for example, clips or latches. In one aspect of the disclosure, optical modules 306 may be removable from housing 302 and replaceable. For example, the lids 308 may be removed. In this regard, the optical modules 306 may be removably secured within sockets in the transceiver 300.

Located within housing 302 may be one or more jumpers 310. Jumpers may be any type of connector capable of transmitting an optical signal. In one aspect of the disclosure, the jumpers 310 may be optical cables. The jumpers 310 may be arranged not to exceed a minimum bend radius to ensure data integrity and prevent mechanical destruction of jumpers 310. As noted above, the disclosure contemplates the use of any number of optical modules 306 and accordingly, any number of jumpers 310, including as few as one. Jumpers 310 may be connected to one or more transceiver connectors 312. Transceiver connectors 312 may be at least partially within housing 302 and may be of any type of connector capable of transmitting an optical signal. In one example, the transceiver connectors 312 may be USB connectors. As noted above, the disclosure contemplates the use of any number of optical modules 306 and accordingly, any number of transceiver connectors 312, including as few as one.

The pluggable transceiver 300 is depicted in FIG. 3 as being connected to a pair of fiber cable connectors 314 and corresponding fiber cables 316. Fiber cable connectors 314 may be any type of connector adapted to receive transceiver connectors 312 and to transmit an optical signal to fiber cables 316. In one example, the fiber cable connectors may be USB connectors.

Figure 4:
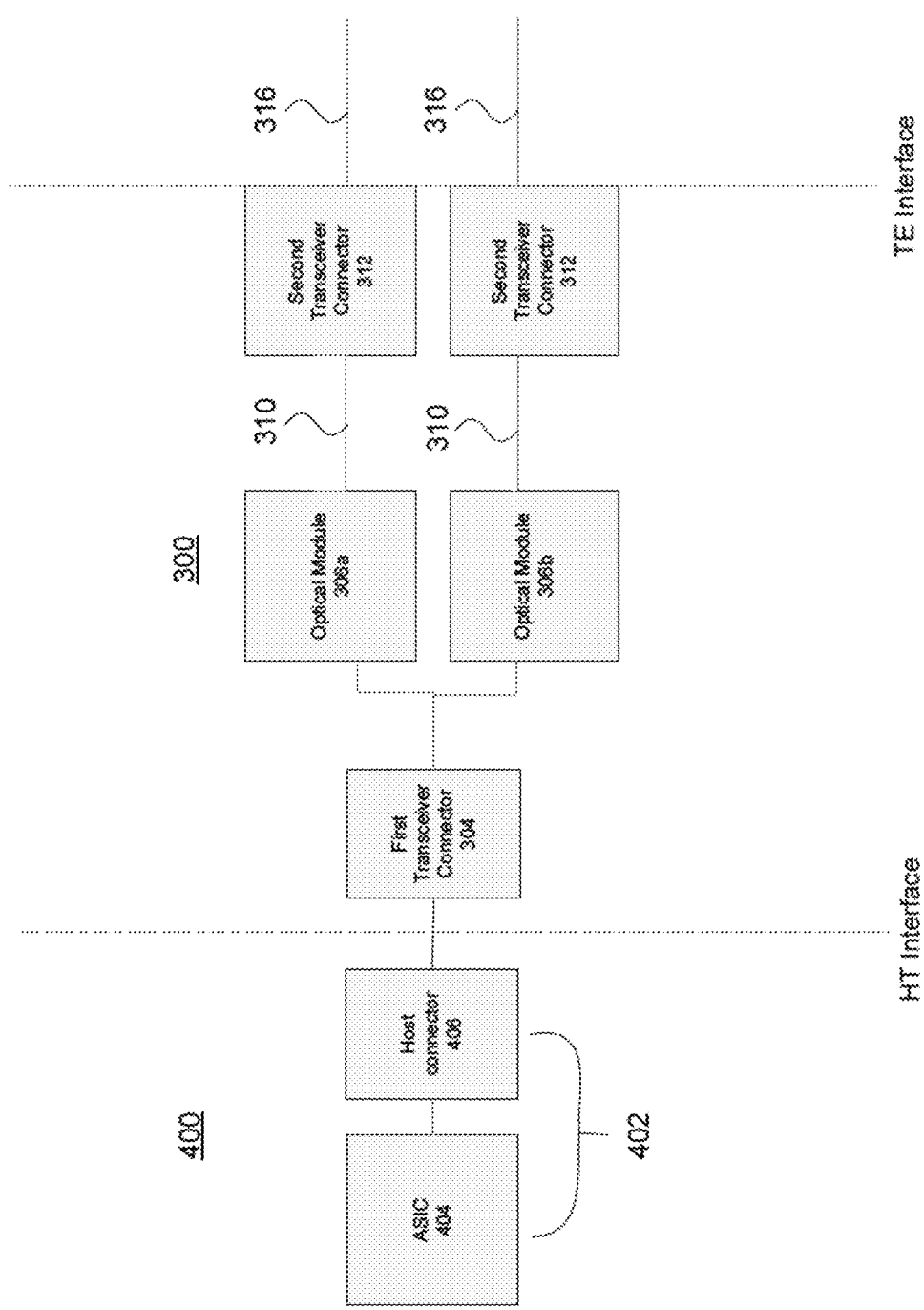
FIG. 4 is a block diagram depicting an exemplary pluggable transceiver connected to a host device according to aspects of the disclosure.

FIG. 4 is a diagram depicting an exemplary pluggable transceiver 300 connected to a host device 400 according to aspects of the disclosure. The host device 400 may include a motherboard section 402, which has an ASIC 404 and a host connector 406. ASIC 404 may be connected to host connector 406 through any desired connection, and in one example may include 4×10 G serial links. Interface line HT represents an interface between the host device and the pluggable transceiver 300. In one example, a first transceiver connector 304 may interface directly with host connector 406. In a transmit direction, the 4×10 G lanes may be divided into two 2×10 GB lanes and may be distributed amongst optical modules 306a and 306b. The optical modules 306a and 306b may then convert each 2×10 GB electrical signal to a corresponding optical signal. Fiber jumpers 310 may be located in a transmit direction from the optical modules 306, and may provide the now converted optical signal to second transceiver connectors 312. Interface line TE represents the interface between the pluggable transceiver 300 and external cables 316.

Figure 5A:
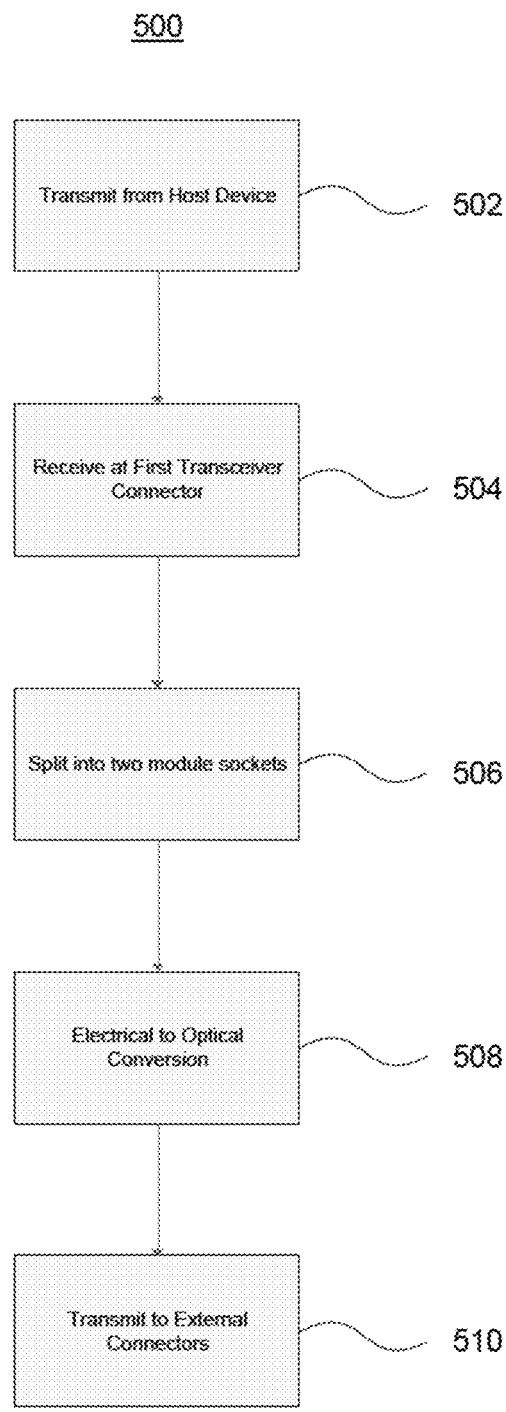
FIGS. 5A and 5B are flow charts depicting operation of an exemplary pluggable transceiver in transmit and receipt directions according to aspects of the disclosure.

FIG. 5A is a flow chart 500 depicting the operation in a transmit direction of an exemplary pluggable transceiver according to aspects of the disclosure. At block 502, an electrical signal may be transmitted from a host device, such as a network switch. The electrical signal may have a 2×10 G bandwidth, a 4×10 G bandwidth, or any other bandwidth capable of being transmitted by a host device. At block 504, the electrical signal may be transmitted from a host connector 406 on the host device to the pluggable transceiver. In one example, a first transceiver connector 304 may connect to a host device and receive an electrical signal. At block 506, the electrical signal may be split into two lanes. In one example, each lane has a 2×10 G bandwidth. In another example, each lane has a 1×10 G bandwidth. In yet another example, the electrical signal may not be split but may be transmitted by a single 2×10 G or 1×10 G bandwidth lane. At block 508, an electrical signal may be converted to an optical signal. This may be done through one or more optical modules 308. Block 510 represents an optical transport of the now converted optical signal to an external optical cable. In one example, second transceiver connector 312 may receive an optical signal from a jumper 310 and transmit the optical signal to fiber connectors 314 and fiber cables 316.

Figure 5B:
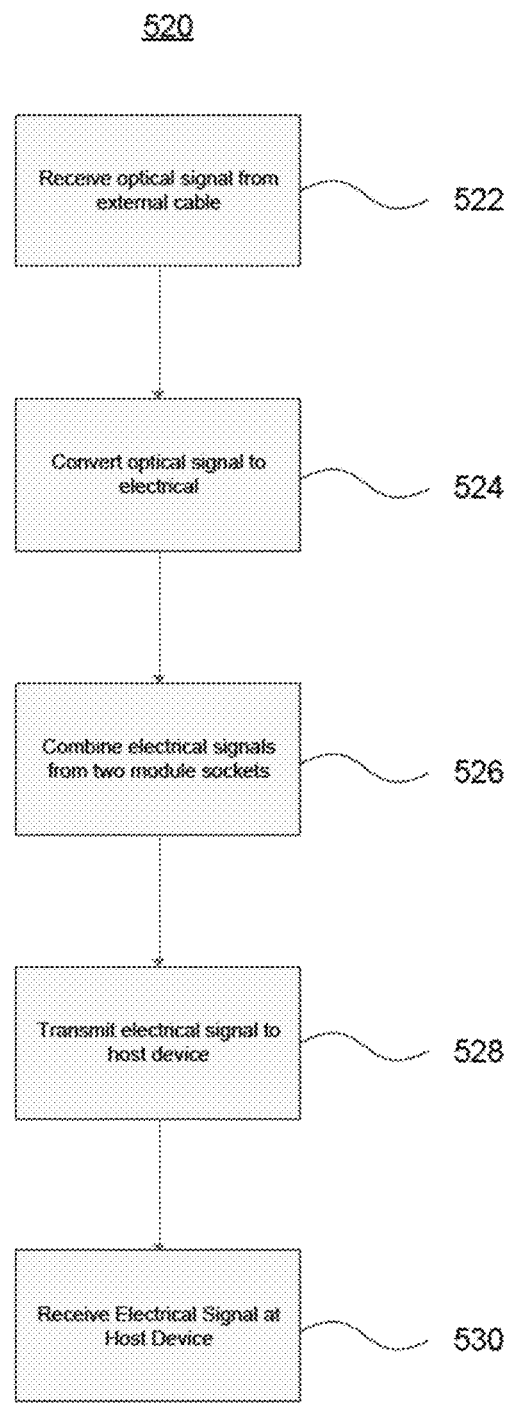

FIG. 5B is a flow chart 520 depicting the operation in a receive direction of an exemplary pluggable transceiver according to aspects of the disclosure. At block 522, one or more optical signals may be received from an external optical cable. In one example, one or more second transceiver connectors receive an optical signal. At block 524, the optical signals may be converted to corresponding electrical signals. In one example, optical modules 306 may convert an optical signal to an electrical signal. At block 526, the now converted electrical signals may be combined from two module sockets. At block 528, the now combined electrical signal may be transmitted to a connector on a host device, and the electrical signal may be received at the host device at block 530.

It should be noted that an exemplary pluggable transceiver may also connect and transmit to/from a device with a 2×10 G bandwidth. In one embodiment, a pluggable transceiver 300 may include one optical module 306 and two jumpers 310. In this example, a 2×10 G electrical signal is split into two 1×10 G electrical signals, with each being transmitted to a separate optical module. After conversion, each respective optical module may transmit to a second transceiver connector at a bandwidth of 1×10 G through a jumper. The housing may include two second transceiver connectors 312 and may accommodate two external cables 316.

In another embodiment, a pluggable transceiver may include one optical module and one 2×10 G jumper to accommodate a 2×10 G bandwidth from a host device and/or external cables. In this example, the step of splitting an electrical signal may be eliminated, since the entire bandwidth may transmit through a single optical module 306, a single jumper 310, and a single transceiver connector 312. The pluggable transceiver 300 may include only one second transceiver connector and may only accommodate one external cable 316. It should also be noted that the exemplary pluggable transceiver may include any number of optical modules, jumpers, and second transceiver connectors to accommodate any bandwidth to/from either a host device or external cables.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A pluggable optical transceiver, comprising:
   a housing;
   a first transceiver connector configured to receive an electrical signal from a host device;
   a first optical module, replaceably secured within the housing, connected to the first transceiver connector and configured to convert a first portion of the electrical signal to a first optical signal;
   a second optical module, replaceably secured within the housing, connected to the first transceiver connector and configured to convert a second portion of the electrical signal to a second optical signal; and
   two second transceiver connectors for receiving the first and second optical signals from the first and second optical modules, respectively.

2. The pluggable optical transceivers of claim 1 further comprising:
   a first jumper connected to the first optical module, the first jumper being configured to transmit the first optical signal to a first of the two second transceiver connectors; and
   a second jumper connected to the second optical module, the second jumper being configured to transmit the second optical signal to a second of the two second transceiver connectors.

3. The pluggable optical transceiver of claim 2, wherein the first and second jumpers are arranged within the housing so as not to exceed a minimum bend radius.

4. The pluggable optical transceiver of claim 1, wherein the first transceiver connector corresponds to a host connector on the host device.

5. The pluggable optical transceiver of claim 1, wherein the first transceiver connector is an IEEE 802.3-compliant QSFP connector.

6. The pluggable optical transceiver of claim 1, wherein the first and second optical modules include lids.

7. The pluggable optical transceiver of claim 1, wherein the two second transceiver connectors are USB connectors.

8. A pluggable optical transceiver, comprising:
a housing;
two second transceiver connectors configured to receive first and second optical signals, respectively;
a first optical module, replaceably secured within the housing, connected to a first of the two second transceiver connectors, and configured to convert the first optical signal to a first electrical signal;
a second optical module, replaceably secured within the housing, connected to the second of the two second transceiver connectors, and configured to convert the second optical signal to a second electrical signal;
a first transceiver connector configured to transmit the first and second electrical signals, combined together, to a host device.

9. The pluggable optical transceiver of claim 8, further comprising:
a first jumper connected to the first of the two second transceiver connectors, the first jumper being configured to transmit the first optical signal to the first optical module; and
a second jumper connected to the second of the two second transceiver connectors, the second jumper being configured to transmit the second optical signal to the second optical module.

10. The pluggable optical transceiver of claim 9, wherein said first and second jumpers are arranged so as not to exceed a minimum bend radius.

11. The pluggable optical transceiver of claim 9, wherein said second transceiver connector is USB.

12. The pluggable optical transceiver of claim 8, wherein the first transceiver connector corresponds to a host connector on the host device.

13. The pluggable optical transceiver of claim 8, wherein the first transceiver connector is an IEEE 802.3-compliant QSFP connector.

14. The pluggable optical transceiver of claim 8, wherein the first and second optical modules include lids.

15. A pluggable optical transceiver for connecting to a host device, the host device comprising a motherboard including a host connector configured to connect to the pluggable optical transceiver, the pluggable optical transceiver comprising:
a housing;
a first transceiver connector configured to receive an electrical signal from the host device;
a first optical module, replaceably secured within the housing, connected to the first transceiver connector and configured to convert a first portion of the electrical signal to a first optical signal;
a second optical module, replaceably secured within the housing, connected to the first transceiver connector and configured to convert a second portion of the electrical signal to a second optical signal; and
two second transceiver connectors configured to receive the first and second optical signals, from the first and second optical modules, respectively.

16. The pluggable optical transceiver of claim 15 further comprising:
A first jumper connected to the first optical module, the first jumper being configured to transmit the first optical signal to a first of the two second transceivers; and
a second jumper connected to the second optical module, the second jumper being configured to transmit the second optical signal to a second of the two second transceiver connectors.

17. The pluggable optical transceiver of claim 16, wherein the first transceiver connector corresponds to a host connector on the host device.

18. The pluggable optical transceiver of claim 16, wherein the first and second jumpers are arranged so as not to exceed a minimum bend radius.

19. The pluggable optical transceiver of claim 16, wherein the two second transceiver connectors are USB.

20. The pluggable optical transceiver of claim 15, wherein the first transceiver connector is an IEEE 802.3-compliant QSFP connector.

21. The pluggable optical transceiver of claim 15, wherein the first and second optical modules include lids.

* * * * *